(No Model.)

W. A. CARSON.
GATE OPENER.

No. 568,402. Patented Sept. 29, 1896.

Witnesses.

Inventor
William A. Carson
By John Wedderburn
his Atty.

UNITED STATES PATENT OFFICE.

WILLIAM A. CARSON, OF LETART, WEST VIRGINIA.

GATE-OPENER.

SPECIFICATION forming part of Letters Patent No. 568,402, dated September 29, 1896.

Application filed May 16, 1896. Serial No. 591,814. (No model.)

*To all whom it may concern:*

Be it known that I, WILLIAM A. CARSON, a citizen of the United States, residing at Letart, in the county of Mason and State of West Virginia, have invented certain new and useful Improvements in Gate-Openers; and I do hereby declare the following to be a full, clear, and exact description of the invention, such as will enable others skilled in the art to which it appertains to make and use the same.

My invention relates to improvements in sliding gates or doors, the object of the same being to provide mechanism for readily and conveniently shifting sliding doors, gates, or window-sashes, whereby they will be held in the position to which they are moved and may be opened or closed therefrom as desired.

The invention consists of a pair of uprights or posts between which the gate or door slides, a vertical shaft mounted to rotate between said posts, a pulley on said shaft, cords surrounding said pulley and connected at their outer ends to the sides of said door or gate, a beveled pinion on the upper end of said shaft, and a cog-wheel or circular rack adapted to engage said pinion, located upon the top of said uprights and operated by means of a suitable lever.

The invention also consists in other details of construction and combinations of parts, which will be hereinafter more fully described and claimed.

Figure 1:
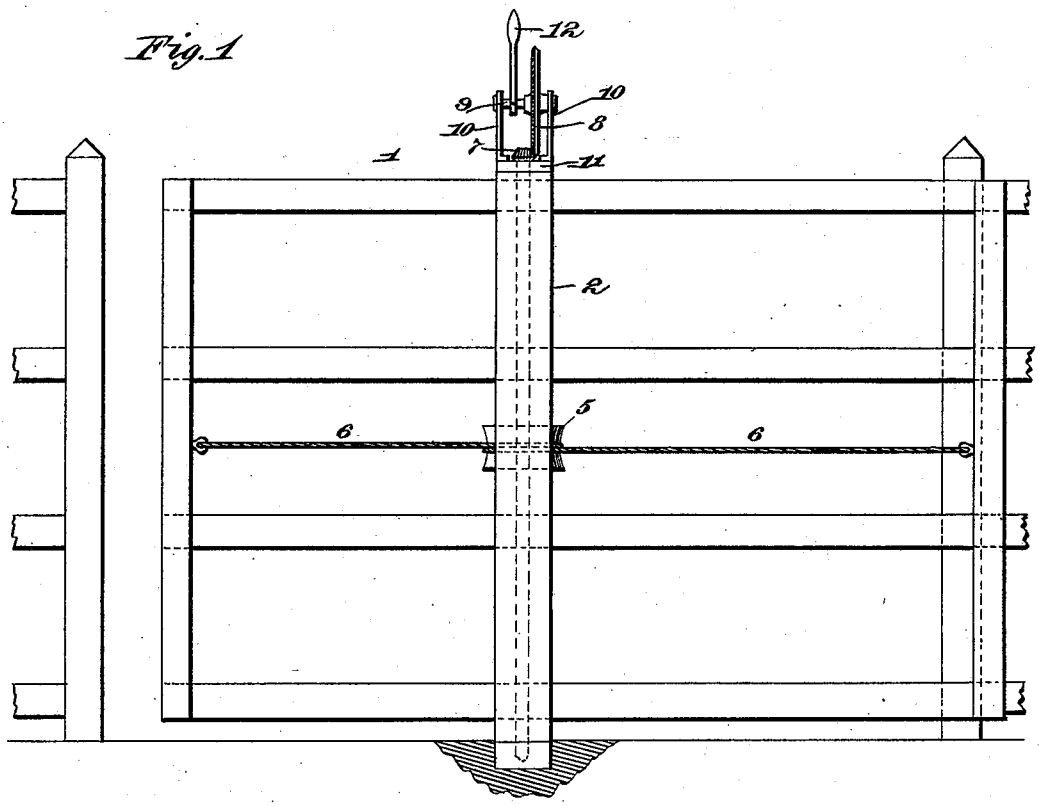
Figure 2:
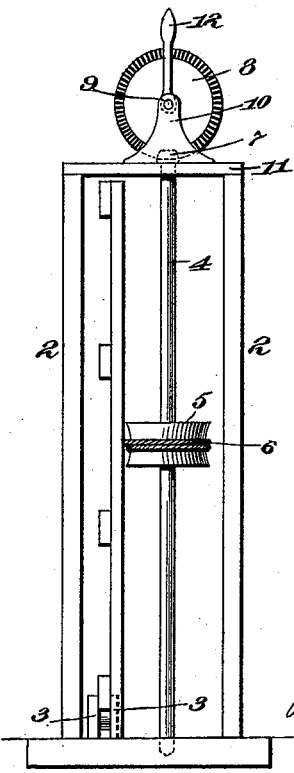

In the drawings forming part of this specification, Figure 1 represents a side elevation of my device, the gate being shown partly open therein. Fig. 2 is an end view of the same.

Like reference-numerals indicate like parts in the two views.

The gate 1 is of ordinary form of construction and is mounted to move between two uprights or posts 2 2, the said gate sliding on ways 3 3 on the inside of said posts or upon a suitable track on the floor or ground. Located between the posts 2 2 is an upright shaft 4, which is mounted to rotate in suitable bearings and has a pulley 5 secured to it at a point near its center. Around this pulley is wound a cord or wire 6, which is connected at its outer ends to the side bars of the gate 1. The upper end of the shaft 4 has a beveled pinion 7 secured to it, which is engaged by a beveled cog-wheel or circular rack 8, mounted upon a shaft 9, which moves in suitable bearings in uprights 10 on the cross-bar 11, connecting the upper ends of the posts 2. This cog-wheel or rack is adapted to be moved in one direction or the other by means of a lever 12, secured thereto.

In Fig. 1 the gate is shown in a partially-open position with the lever 12 raised. If it is desired to close the gate 1, it is merely necessary to press down the lever 12, which turns the circular rack 8, and the latter, engaging the pinion 7 on the upper end of the shaft 4, rotates said shaft and the pulley 5, connected thereto. As the said pulley is turned the cord 6 is wound thereon in one direction and unwound therefrom in the other direction, the result of this action being to shift the gate 1 in its bearings.

Having now described my invention, what I claim as new, and desire to secure by Letters Patent, is—

The combination with a pair of uprights and a gate or door mounted to slide between said uprights, of a vertical shaft located between said uprights, a pulley secured to said shaft, a cord wound around said pulley and connected to the outer ends of said gate, a pinion upon the upper end of said shaft, a cog-wheel or circular rack engaging said pinion, mounted in suitable bearings in the cross-bar at the top of said uprights, and a lever connected to said cog-wheel or rack, substantially as and for the purpose described.

In testimony whereof I have signed this specification in the presence of two subscribing witnesses.

WILLIAM A. CARSON.

Witnesses:
DAVID KLINGENSMITH,
J. W. LYONS.